(No Model.) 2 Sheets—Sheet 2.
D. YATES & B. BROCK.
SYSTEM FOR COOLING AND DISTRIBUTING DRINKING WATER.
No. 460,490. Patented Sept. 29, 1891.
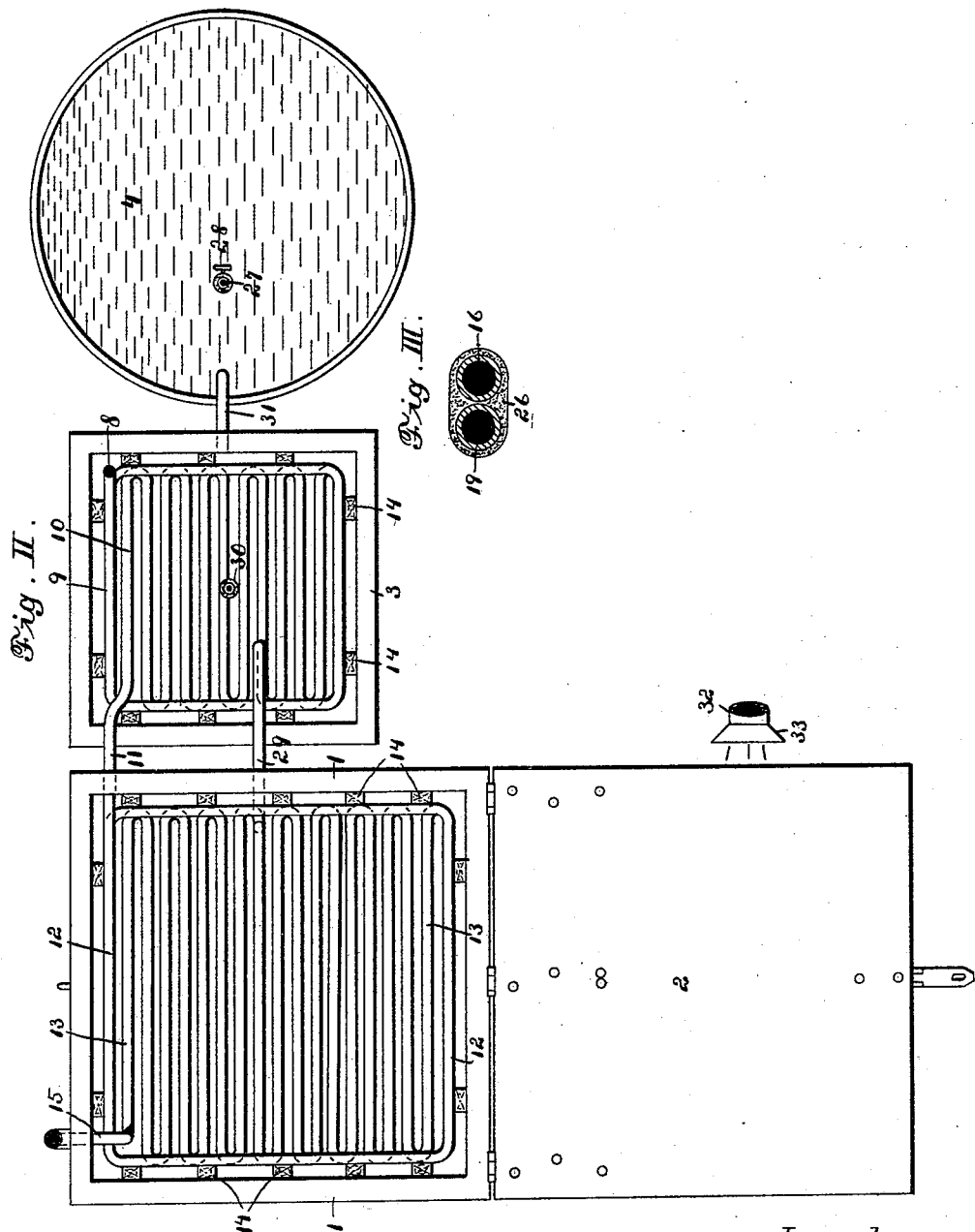
Witnesses:
F. G. Fischer
E. Arthur
Inventors:
Dent Yates & B. Brock
By [signature], Attys.

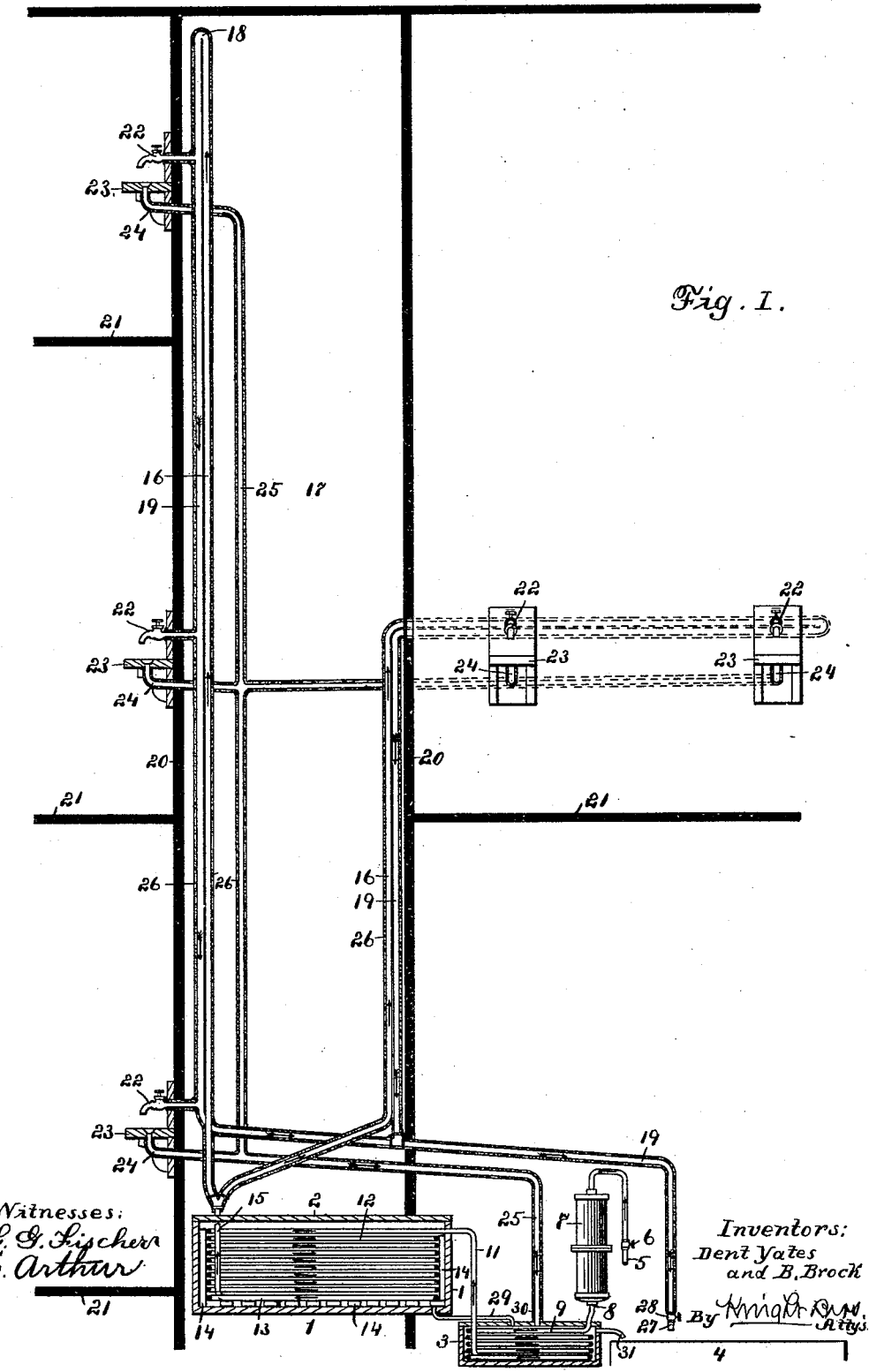

UNITED STATES PATENT OFFICE.

DENT YATES AND BENJAMIN BROCK, OF KANSAS CITY, MISSOURI; SAID BROCK ASSIGNOR TO SAID YATES.

SYSTEM FOR COOLING AND DISTRIBUTING DRINKING-WATER.

SPECIFICATION forming part of Letters Patent No. 460,490, dated September 29, 1891.

Application filed August 6, 1890. Serial No. 361,164. (No model.)

*To all whom it may concern:*

Be it known that we, DENT YATES and BENJAMIN BROCK, both of Kansas City, in the county of Jackson and State of Missouri, have invented certain new and useful Improvements in a System for Cooling and Distributing Drinking-Water, of which the following is a full, clear, and exact description, reference being had to the accompanying drawings, which form a part of this specification.

Our invention relates to certain new and useful improvements in a system for cooling and distributing drinking-water; and our invention consists in features of novelty hereinafter described, and pointed out in the claims.

Figure I is a vertical section of our improved device. Fig. II is a plan view of the main ice-box, the auxiliary cooling-box, and the elevator-tank. Fig. III is an enlarged transverse section of the water-pipes and the insulation material which surrounds them.

Referring to the drawings, 1 represents the main ice box or receptacle, said box being provided with a hinged cover 2.

3 represents an auxiliary cooling-box, the top of which is on a lower level that the bottom of the main ice-box 1.

4 represents the elevator supply-tank.

5 represents the water-supply pipe, which may be suitably connected with the main, said water-supply being governed by a valve 6, situated in the pipe.

7 represents a filter, to which the supply-pipe is connected. Said filter may be of any approved construction. The pipe is connected with the opposite end of the filter, as shown at 8, and extends into the auxiliary cooling-box 3, being coiled about the sides of the same from top to bottom, as shown at 9, and also passing back and forth across the bottom of the box, (see Fig. II,) as shown at 10. The pipe then extends up from the bottom of the box 3 to a point near the top of the box 1, as shown at 11, from whence it is coiled around the sides of said box from top to bottom, as shown at 12, and then passed back and forth across the bottom of the same, as shown at 13, the water in each case thus passing from the top to the bottom of the box before proceeding on its way.

14 represents cleats on the sides and bottoms of the boxes, which prevent the pipe from coming in contact with the sides and bottom of the boxes, and thus permits a free circulation of cold air around the pipes. The pipe passes up from the bottom of the box 1, as shown at 16, to a point near the top of the elevator-shaft 17, where a return-bend 18 is made, and then descends, as shown at 19, in close proximity to the up-pipe 16.

20 represents the walls of the elevator-shaft, and 21 the different floors in a building.

22 represents water-cocks connected with the down-pipe 19 and extending through the walls of the elevator-shaft on each floor of the building, so that ready access may be had thereto in order to draw the water.

23 represents receptacles located beneath each of the cocks for the purpose of catching the waste water.

24 represents branch drain-pipes connecting the receptacles 23 with a main drain-pipe 25, through which the waste water is conducted to the auxiliary tank 3. If desired, the pipes may extend along a lateral hall on each floor, as shown in dotted lines, Fig. I, the system being the same in each case. The exposed pipes are all covered with insulation material 26, to prevent them being affected by the atmosphere. The up-pipes and down-pipes are placed in close proximity to each other, as before stated, and the insulation material is wrapped around them, as shown in Fig. III, so that the cold water ascending in the up-pipe will assist in keeping the down-pipe cool. It will be seen that the water coming from the ice-box must travel to the extreme end of the up-pipe and descend by the down-pipe before any of it can be drawn off by the drinking-cocks. Thus a complete circulation is kept up, and the water in the upper portion of the pipe is not allowed to become warm, as would be the case if a single pipe were used, it of course being understood that there is sufficient head to the water to force it through the pipes. The unfeathered arrows show the course of the water in the up-pipes, and the feathered arrows show the course of the water in the down-pipes. The down-pipe terminates at a point 27 directly over the supply-tank 4, into which it may be drained, when desired, by opening a valve 28. A quantity of ice may be placed in box 1, and, as the water in the pipes situated in the box travels from the top to the bottom and across the bottom a number of times, it will be seen that so long as any ice remains in the box the water must be cooled thereby in its passage through the box.

29 represents a drain-pipe leading from the bottom of the main ice-box 1 to the auxiliary cooling-box 3. Thus the cold water from the melting ice will pass into the cooling-box 3 and cool the supply water to some extent before it passes into the main ice-box. The drain-pipe 25 also discharges the cold waste water into the auxiliary cooling-box, as shown at 30, thereby assisting in cooling the supply-water on its way to the ice-box.

31 represents an overflow-pipe, which conveys the overflow from the cooling-box to the elevator-tank.

36 represents an exhaust or discharge pipe leading from the ice-box. The exhaust-pipe 36 may be connected with one of the flues of the building or may have an exhaust-fan connected therewith, by which a constant current of cool air may be made to pass through the box 1 and cool the water in the pipes. The exhaust is controlled by a damper 37 in the pipe 36. The insulation of the pipes, while retaining the cold air, will at the same time prevent the warm air from coming in contact with the pipes.

We claim as our invention—

1. The combination of a water-cooling device, one or more supply-pipes extending throughout a building, and a like number of return-pipes, water-cocks connected with the return-pipes, waste-water receptacles beneath the cocks, and waste-pipes connected with said receptacles and with said cooling device, whereby the waste water is reconveyed to the cooling device, substantially as described, and for the purpose set forth.

2. The combination of the auxiliary cooling-box 3, ice-box 1, connected with the box 3, cooling-coils located in said boxes and connected together, pipes in connection therewith extending throughout a building, and the waste-water pipes leading to said box 3, whereby cold water may be conveyed to any part of said building and the waste water utilized to cool the supply-water, substantially as described, and for the purpose set forth.

3. The combination of the ice-box 1, cooling-box 3, filter 7, pipes located in the ice-box and cooling-box and connected together, pipe 29, connecting the ice-box with the cooling-box, pipes 16, extending upward from the pipes in the ice-box, return-pipes 19, and waste-pipe 25, said waste-pipe 25 discharging the cool waste water into the cooling-box 3, substantially as described, and for the purpose set forth.

4. The combination of the ice-box 1, cooling-box 3, filter 7, located above the level of the boxes 1 and 3, pipes located in the ice-box and cooling-box and connected together, pipe 29, connecting the ice-box with the cooling-box, pipes 16, extending upward from the pipes in the ice-box, return-pipes 19, connecting with said pipes 16 and being arranged in juxtaposition thereto, so as to be cooled thereby, and waste-pipe 25, said waste-pipe 25 discharging the cool waste water into the cooling-box 3, substantially as described, and for the purpose set forth.

5. In a system for cooling and distributing drinking-water, the combination of a cooling device, a continuous pipe extending up to the highest point of consumption in the building and then down to the lowest point of consumption, and the draw-cocks tapped into the down branch of said pipe, said pipe being in connection with said cooling device and being so situated and the water-cocks in connection therewith being so arranged that when water is drawn from any of the cocks there will be a complete circulation of the water in the pipes between the cooling device and such cock, substantially as described, and for the purpose set forth.

DENT YATES.
BENJAMIN BROCK.

Witnesses:
MAX RAUH,
E. M. SCALES.